US011975840B2

(12) United States Patent
Malatrasi et al.

(10) Patent No.: US 11,975,840 B2
(45) Date of Patent: May 7, 2024

(54) FUSE LINK HEAD IMPACT CRITERIA MITIGATING DEVICE

(71) Applicant: B/E Aerospace, Inc., Winston-Salem, NC (US)

(72) Inventors: Gianpaolo Malatrasi, Rural Hall, NC (US); Stephen A. Puglisi, Greensboro, NC (US); Ryan J. Suhre, Winston-Salem, NC (US); Samuel Ponjican, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/709,676

(22) Filed: Mar. 31, 2022

(65) Prior Publication Data

US 2023/0312096 A1 Oct. 5, 2023

(51) Int. Cl.
*B64D 11/06* (2006.01)

(52) U.S. Cl.
CPC ................. *B64D 11/0619* (2014.12)

(58) Field of Classification Search
CPC . B64D 11/06; B64D 11/0619; B64D 11/0638; B64D 11/064; B64D 25/04; B60N 2/4221; B60N 2/42709
USPC ............................ 297/216.1, 216.13, 216.14
See application file for complete search history.

(56) References Cited

U.S. PATENT DOCUMENTS

| 5,320,308 | A | * | 6/1994 | Bilezikjian | ........ B60N 2/42745 297/216.1 |
| 5,676,421 | A | * | 10/1997 | Brodsky | .............. B60N 2/4214 297/216.19 |
| 6,478,256 | B1 | * | 11/2002 | Williamson | ......... B64D 11/064 297/216.14 |
| 8,408,643 | B2 | * | 4/2013 | Honnorat | ........... B64D 11/0619 297/216.17 |
| 10,227,023 | B2 | * | 3/2019 | Lasell | ..................... B60N 2/682 |
| 10,384,783 | B2 | * | 8/2019 | Murray | .............. B60N 2/42745 |
| 10,689,118 | B2 | * | 6/2020 | Pierson-Moonan | ... B64D 25/04 |
| 10,696,195 | B2 | * | 6/2020 | Young | ................ B60N 2/42709 |
| 10,773,805 | B2 | | 9/2020 | Malligere et al. | |
| 10,967,975 | B2 | * | 4/2021 | Rife | ........................ B60N 2/682 |

(Continued)

FOREIGN PATENT DOCUMENTS

| CN | 106741965 A | 5/2017 | |
| EP | 2706010 A2 * | 3/2014 | ........... B60N 2/4221 |

(Continued)

OTHER PUBLICATIONS

Extended European Search Report dated Aug. 8, 2023; European Application No. 23163870.1.

*Primary Examiner* — James M Ference
(74) *Attorney, Agent, or Firm* — Suiter Swantz IP

(57) ABSTRACT

A head impact criteria (HIC) device for a controlling a breakover rate of a seatback of an aircraft seat, and a method of manufacturing the same, are disclosed. A first energy absorbing member is coupled to the seatback of the aircraft seat. A second energy absorbing member is coupled to a frame of the aircraft seat. A fuse link is encapsulated by the first energy absorbing member and the second energy absorbing member. In response to the HIC device being subjected to a threshold load associated with a dynamic event, the fuse link breaks and the first energy absorbing member and the second energy absorbing member rotate around the axis.

15 Claims, 3 Drawing Sheets

(56) References Cited

U.S. PATENT DOCUMENTS

| | | | |
|---|---|---|---|
| 11,007,913 B2 * | 5/2021 | Saada | B60N 2/42745 |
| 11,059,587 B2 * | 7/2021 | Finlay | B64D 11/064 |
| 2010/0013279 A1 * | 1/2010 | Cailleteau | B60N 2/42709 |
| | | | 297/216.13 |
| 2013/0049416 A1 | 2/2013 | Funke et al. | |
| 2014/0070578 A1 * | 3/2014 | Szelagowski | B60N 2/42745 |
| | | | 297/216.13 |
| 2014/0265474 A1 * | 9/2014 | Mcculloch | B60N 2/22 |
| | | | 297/216.14 |
| 2017/0210474 A1 * | 7/2017 | Pacheco | B64D 11/0696 |
| 2018/0016015 A1 * | 1/2018 | Pacheco | B64D 11/0619 |
| 2018/0222361 A1 * | 8/2018 | Murray | B60N 2/42745 |
| 2018/0264979 A1 * | 9/2018 | Lasell | B60N 2/4249 |
| 2018/0346125 A1 * | 12/2018 | Thompson | B64D 11/0619 |
| 2019/0031352 A1 * | 1/2019 | Pierson-Moonan | B60N 2/4221 |
| 2019/0112051 A1 * | 4/2019 | Finlay | B64D 11/064 |
| 2019/0263526 A1 * | 8/2019 | Rife | B64D 11/0619 |
| 2020/0339264 A1 * | 10/2020 | Baldomero | B64D 11/0619 |
| 2021/0237881 A1 * | 8/2021 | Marais | B60N 2/42709 |
| 2021/0261259 A1 * | 8/2021 | D'Alessio | B64D 11/064 |
| 2023/0312096 A1 * | 10/2023 | Malatrasi | B60N 2/42709 |
| | | | 297/216.13 |

FOREIGN PATENT DOCUMENTS

| | | | | |
|---|---|---|---|---|
| EP | 3434512 A1 * | 1/2019 | | B60N 2/4221 |
| EP | 3468833 B1 | 9/2021 | | |
| FR | 3006668 A1 * | 12/2014 | | B64D 11/06 |
| FR | 3014156 A1 * | 6/2015 | | B60N 2/4242 |
| WO | WO-2011069641 A2 * | 6/2011 | | B60N 2/23 |
| WO | WO-2017044170 A1 * | 3/2017 | | B60N 2/4221 |
| WO | WO-2017218240 A1 * | 12/2017 | | B60N 2/22 |
| WO | WO-2019201604 A1 * | 10/2019 | | B60N 2/4221 |
| WO | 2021221652 A1 | 11/2021 | | |

* cited by examiner

FUSE LINK HEAD IMPACT CRITERIA MITIGATING DEVICE

BACKGROUND

Aircraft seating configurations may provide for a seatback capable of breaking over during an impact event (e.g., accident or crash). For example, a passenger seat may broadly comprise a bottom chassis (upon which the passenger sits) and a seatback supporting the passenger's upper body, the rear of which seatback may face a second passenger sitting directly behind the passenger occupying the seat. The seatback can comprise, for example, a tray table assembly, tablet holder, literature pocket, display screen and console, or any combination of these components. In the event of a crash, rapid deceleration, emergency landing, or other similar impact event, the second passenger's head may be driven forward into the seatback. The seatback may then pivot, or break over, to a full breakover position at a predetermined angle with respect to the bottom chassis. Seatback breakover can mitigate head and/or neck injuries to the second passenger due to a head impact with the seatback.

However, if the seatback breaks freely from the upright position to the full breakover position without any regulation of breakover speed, the resulting disparity in velocity between the seatback and the head of the second passenger may increase, rather than decrease, head injury and neck injury criteria (HIC, NIC) and lead to preventable egress damage which may impede passenger egress from the aircraft.

SUMMARY

A head impact criteria (HIC) device for a controlling a breakover rate of a seatback of an aircraft seat is disclosed in accordance with one or more illustrative embodiments of the present disclosure. In one illustrative embodiment, the device comprises a first energy absorbing member coupled to the seatback of the aircraft seat. In another illustrative embodiment, the device comprises a second energy absorbing member coupled to a frame of the aircraft seat. In another illustrative embodiment, the device comprises a fuse link encapsulated by the first energy absorbing member and the second energy absorbing member, and configured to couple the first energy absorbing member to the second energy absorbing member. The first energy absorbing member, the second energy absorbing member, and the fuse link are capable of transmitting a breakover energy associated with the seatback during a dynamic event. The first energy absorbing member and the second energy absorbing member are configured to rotate around a same axis. In response to the HIC device being subjected to a load above a threshold load associated with the dynamic event, the fuse link breaks, and the breaking of the fuse link enables the first energy absorbing member and the second energy absorbing member to rotate around the axis. A method of manufacturing the HIC device is also disclosed.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
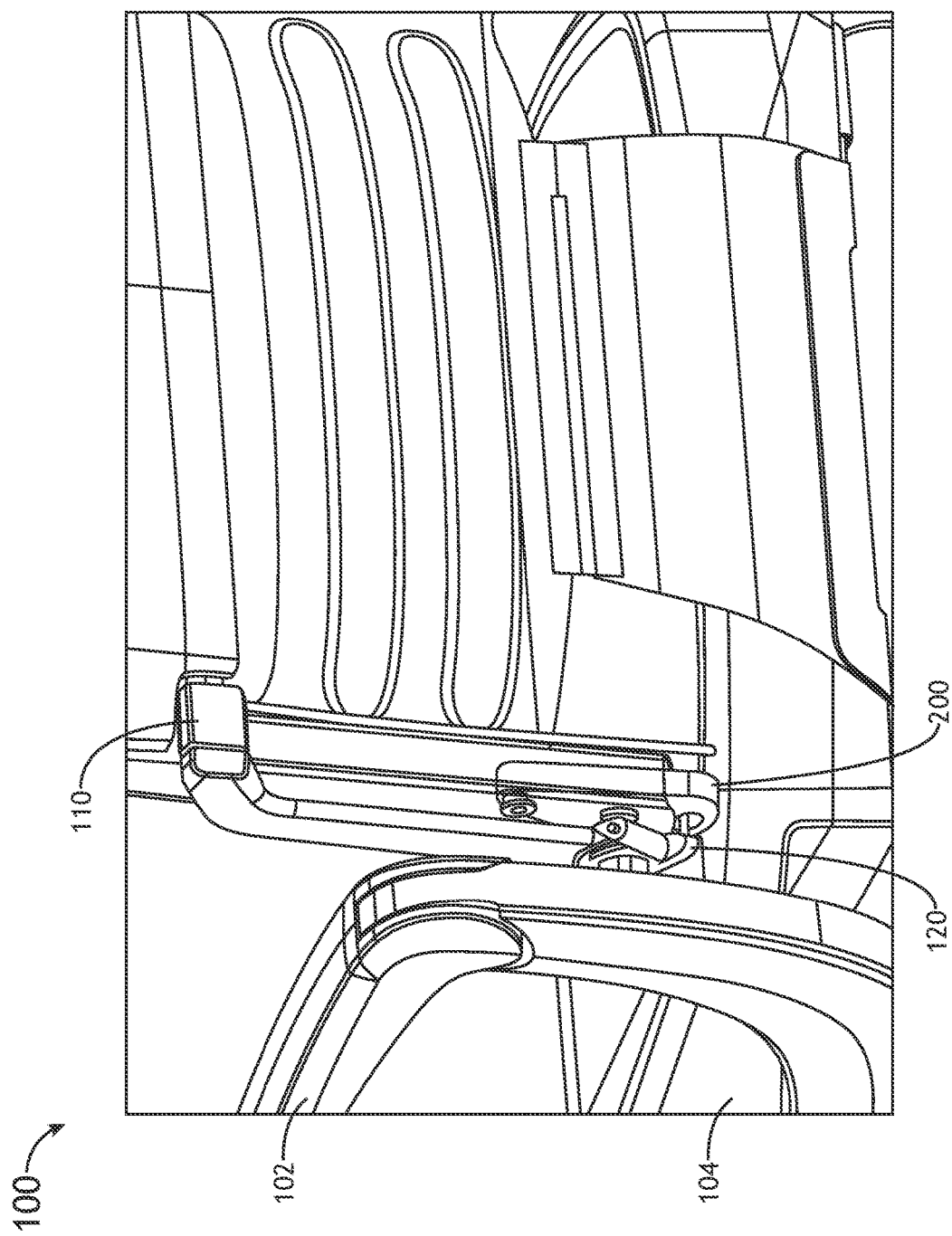
FIG. 1 is a perspective view illustrating an aircraft seat, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Embodiments of the present disclosure are directed to a head impact criterion (HIC) device and a method of manufacturing the same. The HIC device is easy to fine-tune and affordable. The HIC device enables a seatback to break away during a HIC event and thus reduce the impact loads experienced by the passenger. The present HIC device uses two adjacent energy absorbing members rotating about the same axis (e.g., like scissors or pliers). The energy absorbing members are coupled together by a fuse link (e.g., break-away member). In response to the HIC device being subjected to a load (e.g., above a threshold load), the fuse link breaks which enables the two energy absorbing members to rotate relative to each other (which may transfer rotational kinetic energy associated with the seatback to the energy absorbing members). One energy absorbing member may include an appendage that, by pressing against the other energy absorbing member, further reduces loads experienced by a passenger. The fuse link may be manufactured as a sheet metal part that is easily modifiable (e.g., so that the performance of the system can be tuned for the requirements of the specific system).

FIG. 1 is a perspective view illustrating an aircraft seat 100, in accordance with one or more embodiments of the present disclosure. The aircraft seat 100 may include an arm rest 102 (e.g., which may be configured to support a user's arms) and a seat cushion 104 (e.g., which may be configured to support a user's legs). The aircraft seat 100 may comprise a seatback 110 (e.g., which may be configured to support a user's back) and a frame 120 (e.g., base, foundation, etc., connected to a floor of an aircraft).

An HIC device 200 may be at a position between the seatback 110 and the frame 120. The HIC 200 may couple the seatback 110 and the frame 120 (for example, using one or more bolts, one or more screws, etc.), such that the seatback 110 is attached, affixed, or secured to the frame 120. The components of the HIC device 200 may comprise, for example, a metal (e.g., steel, aluminum, titanium, or an alloy thereof), however other high-strength metallic or composite materials (e.g., ceramic, fiber reinforced polymer, etc.) are also contemplated herein.

Figure 2:
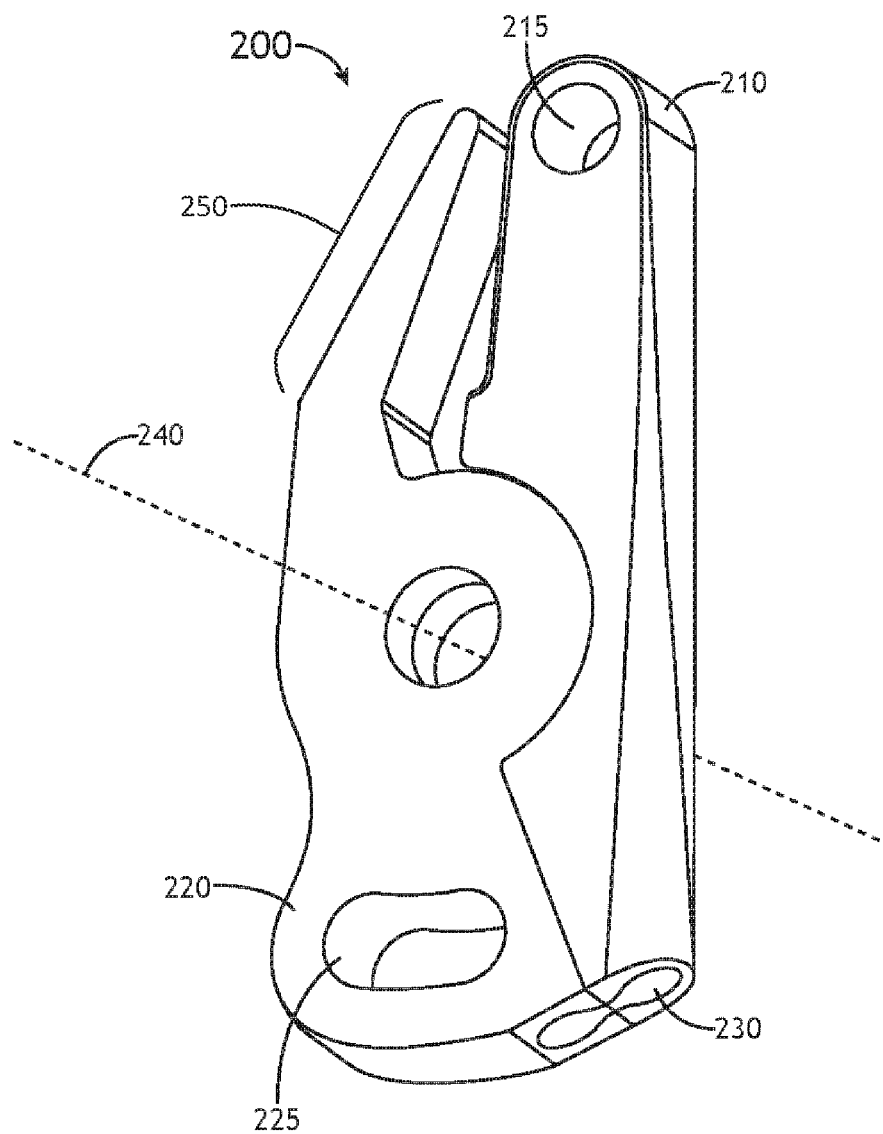
FIG. 2 is a perspective view illustrating an HIC device for controlling a breakover rate of a seatback of an aircraft seat, in accordance with one or more embodiments of the present disclosure.

FIG. 2 is a perspective view illustrating the HIC device 200, in accordance with one or more embodiments of the present disclosure. The HIC device 200 may comprise a first energy absorbing member 210, a second energy absorbing member 220, and a fuse link 230. In some embodiments, the HIC device 200 may further include a shear pin mechanism (not shown) to further reduce a load experienced by a passenger.

The first energy absorbing member 210 may be coupled to the seatback 110 of the aircraft seat 100 (for example, using a bolt passing through the void or cavity 215). The second energy absorbing member 220 may be coupled to the frame 120 of the aircraft seat 100 (for example, using a bolt passing through the void or cavity 225). The members 210 and 220 may each comprise a cylindrical shape or a rectangular-cuboid shape and may have a length (e.g., along a longitudinal axis) substantially greater than a width or thickness.

The members 210 and 220 may include one or more curved surfaces and/or bends. For example, as shown in FIG. 2, the member 220 includes an energy absorbing appendage 250 having a tapered shape. The appendage 250 may be configured to press against the member 210 (e.g., causing the appendage to deform), which may further reduce a load experienced by a passenger during or after a dynamic event.

The fuse link 230 may be partially or completely encapsulated by the first energy absorbing member 210 and the second energy absorbing member 220. The fuse link 230 may be configured to couple the first energy absorbing member 210 to the second energy absorbing member 220, and may be manufactured so that the fuse link 230 fits snugly between the members 210 and 220. In some embodiments, the fuse link 230 is attached, affixed, or secured to the members 210 and 220 using an adhesive (e.g., glue).

In response to the HIC device 200 being subjected to a load (i.e., a force measured in Newtons) above a threshold load associated with a dynamic event, the fuse link 230 may be configured to break (i.e., fracture, snap, etc.). The breaking of the fuse link 230 may enable the first member 210 and the second member 220 to rotate around an axis 240 (e.g., an axis passing through or near a center of the HIC device 200). In this way, the energy absorbing member 210, the energy absorbing member 220, and the fuse link 230 are capable of absorbing a breakover energy associated with the seatback 110 during a dynamic event, and restricting a velocity of the seatback 110 during the dynamic event.

As shown in FIG. 2, a thickness of a middle portion of the fuse link 230 may be smaller than thicknesses of the side portions of the fuse link 230. The thickness of the middle portion of the fuse link 230 may be adjusted (e.g., during the time of manufacture) to change the threshold load associated with the breaking or fracture of the fuse link 230.

Figure 3:
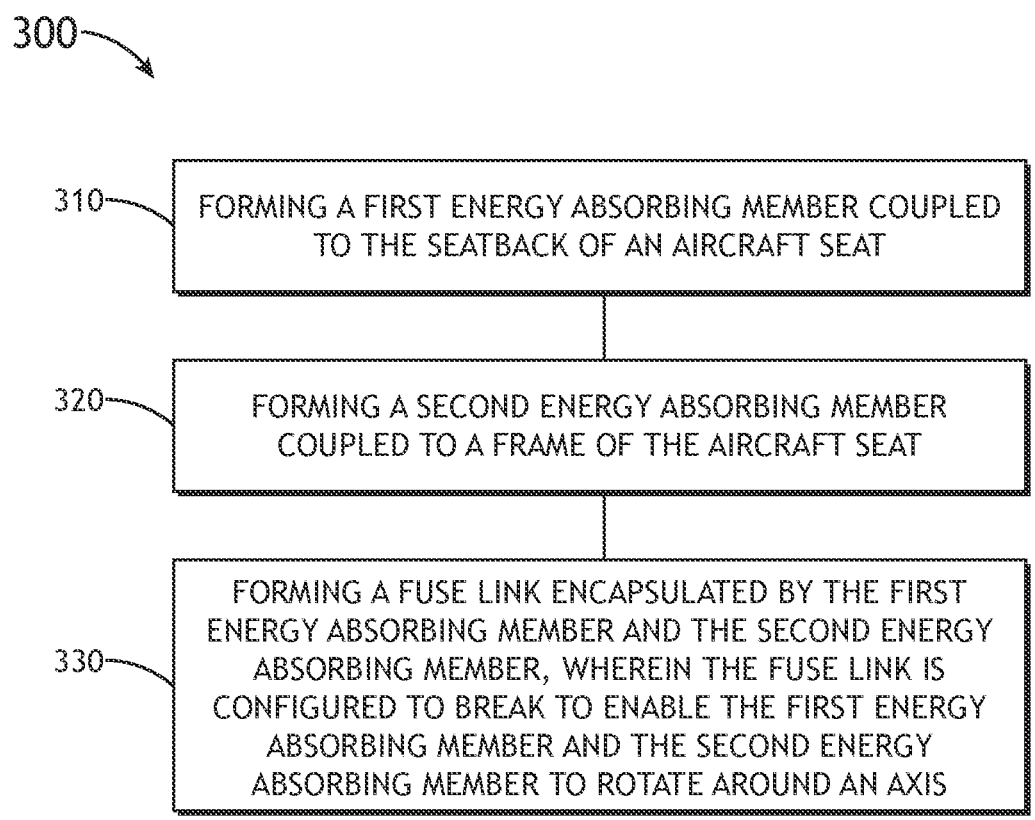
FIG. 3 is a flowchart illustrating a method of manufacturing an HIC device, in accordance with one or more embodiments of the present disclosure.

FIG. 3 is a flowchart illustrating a method 300 of manufacturing an HIC device, in accordance with one or more embodiments of the present disclosure. The HIC device may be similar or identical to the HIC device 200 described with respect to FIGS. 1-2. The components of the HIC device 200 may be formed using additive manufacturing (for example, 3D printing by stereolithography [SLA]), injection molding, and/or by milling or machining, etc.

At 310, a first energy absorbing member is formed. The first energy absorbing member may be configured to couple to the seatback of an aircraft seat.

At 320, a second energy absorbing member is formed. The second energy absorbing member may be configured to couple to a frame of an aircraft seat.

At 330, a fuse link is formed. The fuse link may be configured to be encapsulated by the first energy absorbing member and the second energy absorbing member, and may be configured to couple the first energy absorbing member to the second energy absorbing member.

It is noted herein that the term "length" may be construed as the largest dimension of a given 3-dimensional structure or feature. The term "width" may be construed as the second largest dimension of a given 3-dimensional structure or feature. The term "thickness" may be construed as a smallest dimension of a given 3-dimensional structure or feature.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A head impact criteria (HIC) device for controlling a breakover rate of a seatback of an aircraft seat, the HIC device comprising:
   a first energy absorbing member coupled to the seatback of the aircraft seat;
   a second energy absorbing member coupled to a frame of the aircraft seat;
   a fuse link having a first portion encapsulated by the first energy absorbing member and a second portion encapsulated by the second energy absorbing member, the first and second portions being attached to couple the first energy absorbing member to the second energy absorbing member;
   wherein the first energy absorbing member, the second energy absorbing member, and the fuse link are configured to transmit a breakover energy associated with the seatback during a dynamic event,
   wherein the first energy absorbing member and the second energy absorbing member are configured to rotate around a same axis, and
   wherein, responsive to the HIC device being subjected to a load above a threshold load associated with the dynamic event, the fuse link breaks such that the first and second portions seperate while the first portion remains encapsulated within the first energy absorbing member and the second portion remains enapsulated within the second energy absorbing member, the breaking of the fuse link enabling the first energy absorbing member and the second energy absorbing member to rotate around the axis.

2. The HIC device of claim 1, wherein the breaking of the fuse link restricts a breakover velocity of the seatback and absorbs at least a portion of the breakover energy.

3. The HIC device of claim 1, wherein the second energy absorbing member includes an energy absorbing appendage configured to reduce an impact of the first energy absorbing member during the dynamic event.

4. The HIC device of claim 3, wherein the energy absorbing appendage has a tapered shape.

5. The HIC device of claim 4, wherein, in use, the energy absorbing appendage is configured to contact the first energy absorbing member thereby causing the energy absorbing appendage to deform.

6. The HIC device of claim 1, wherein at least one of the first energy absorbing member, the second energy absorbing member, and the fuse link comprise at least one of metal and composite materials.

7. The HIC device of claim 1, wherein at least one of the first energy absorbing member and the second energy absorbing member has a cylindrical shape or a rectangular-cuboid shape having a greater length than width.

8. The HIC device of claim 1, wherein the fuse link is positioned between the first energy absorbing member and the second energy absorbing member and is coupled to at least one of the first energy absorbing member and the second energy absorbing member.

9. The HIC device of claim 1, wherein the fuse link has a substantially figure eight curved shape.

10. A method of manufacturing a head impact criteria (HIC) device for controlling a breakover rate of a seatback of an aircraft seat, the method comprising:
    forming a first energy absorbing member, the first energy absorbing member configured to couple to the seatback of the aircraft seat;
    forming a second energy absorbing member, the second energy absorbing member configured to couple to a frame of the aircraft seat;
    forming a fuse link, the fuse link including a first portion configured to be encapsulated by the first energy absorbing member and a second portion configured to be encapsulated by the second energy absorbing member, the first and second portions being attached to couple the first energy absorbing member to the second energy absorbing member;
    wherein the first energy absorbing member, the second energy absorbing member, and the fuse link are configured to transmit a breakover energy associated with the seatback during a dynamic event,
    wherein the first energy absorbing member and the second energy absorbing member are configured to rotate around an axis, and
    wherein the fuse link is configured to break responsive to the HIC device being subjected to a load above a threshold load associated with the dynamic event, the breaking of the fuse link causing the first and second portions to separate while the first portion remains encapsulated within the first energy absorbing member and the second portion remains encapsulated within the second energy absorbing member, and the breaking of the fuse link enabling the first energy absorbing member and the second energy absorbing member to rotate around the axis.

11. The method of claim 10, wherein the breaking of the fuse link restricts a breakover velocity of the seatback and absorbs at least a portion of the breakover energy.

12. The method of claim 10, wherein the second energy absorbing member includes an energy absorbing appendage configured to reduce an impact of the first energy absorbing member during the dynamic event, and wherein, in use, the energy absorbing appendage contacts the first energy absorbing member thereby causing the energy absorbing appendage to deform.

13. The method of claim 10, wherein at least one of the first energy absorbing member and the second energy absorbing member are formed to have a cylindrical shape or a rectangular-cuboid shape having a greater length than width.

14. The method of claim 10, further including positioning the fuse link between the first energy absorbing member and the second energy absorbing member and coupling the fuse link to at least one of the first energy absorbing member and the second energy absorbing member.

15. The method of claim 10, wherein the fuse link is formed to have a substantially figure eight curved shape.

* * * * *